United States Patent
Clark

(10) Patent No.: US 10,951,637 B2
(45) Date of Patent: Mar. 16, 2021

(54) DISTRIBUTED DETECTION OF MALICIOUS CLOUD ACTORS

(71) Applicant: Suse LLC, Wilmington, DE (US)

(72) Inventor: Robert Graham Clark, Stoke Gifford Bristol South Gloucestershire (GB)

(73) Assignee: Suse LLC, Wilmington, DE (US)

( * ) Notice: Subject to any disclaimer, the term of this patent is extended or adjusted under 35 U.S.C. 154(b) by 409 days.

(21) Appl. No.: 15/500,033

(22) PCT Filed: Aug. 28, 2014

(86) PCT No.: PCT/US2014/053199
§ 371 (c)(1),
(2) Date: Jan. 28, 2017

(87) PCT Pub. No.: WO2016/032491
PCT Pub. Date: Mar. 3, 2016

(65) Prior Publication Data
US 2017/0244738 A1 Aug. 24, 2017

(51) Int. Cl.
*H04L 29/06* (2006.01)
*H04L 29/08* (2006.01)
(Continued)

(52) U.S. Cl.
CPC ...... *H04L 63/1425* (2013.01); *H04L 63/0227* (2013.01); *H04L 63/1416* (2013.01);
(Continued)

(58) Field of Classification Search
CPC ............. H04L 63/1425; H04L 63/0227; H04L 63/1416; H04L 67/10; H04L 41/5096; H04L 43/028
See application file for complete search history.

(56) References Cited

U.S. PATENT DOCUMENTS 8,739,287 B1 5/2014 Polyakov et al.
9,641,544 B1 * 5/2017 Treat ...................... H04L 63/02
(Continued)

FOREIGN PATENT DOCUMENTS

EP 3186921 A1 7/2017
WO WO-2016032491 A1 3/2016

OTHER PUBLICATIONS

Alharkan, T. et al., "IDSaaS: Intrusion Detection System As a Service in Public Clouds", Cloud Computing 2012 : 3rd International Conference, Jun. 17, 2012, 7 pages.
(Continued)

*Primary Examiner* — Trang T Doan
*Assistant Examiner* — Jessica J South
(74) *Attorney, Agent, or Firm* — Schwegman Lundberg & Woessner, P.A.

(57) ABSTRACT

Examples relate to distributed detection of malicious cloud actors. In some examples, outgoing cloud packets from the cloud server are intercepted and processed to determine if a preliminary threshold is exceeded, where the outgoing cloud packets are used to identify a customer. At this stage, a potential outgoing intrusion event of a number of potential outgoing intrusion events is generated when the preliminary threshold is exceeded. The potential outgoing intrusions events are used to update an aggregate log, where the aggregate log tracks a customer subset of the cloud servers that is associated with the customer. In response to analyzing the aggregate log to determine that cloud traffic by the customer to the destination address exceeds an intrusion threshold, a notification of malicious activity by the customer is provided, wherein the intrusion threshold is satisfied at a higher cloud activity level than the preliminary threshold.

15 Claims, 5 Drawing Sheets

(51) Int. Cl.
*H04L 12/24* (2006.01)
*H04L 12/26* (2006.01)

(52) U.S. Cl.
CPC .......... *H04L 67/10* (2013.01); *H04L 41/5096* (2013.01); *H04L 43/028* (2013.01)

(56) References Cited

U.S. PATENT DOCUMENTS

| | | |
|---|---|---|
| 2003/0145225 A1 | 7/2003 | Bruton et al. |
| 2006/0212332 A1* | 9/2006 | Jackson .................. H04L 47/70 709/226 |
| 2010/0122317 A1 | 5/2010 | Yadav |
| 2012/0216282 A1* | 8/2012 | Pappu ..................... H04L 47/80 726/23 |
| 2014/0013434 A1* | 1/2014 | Ranum ................... H04L 67/10 726/24 |
| 2014/0059683 A1 | 2/2014 | Ashley |
| 2014/0071826 A1* | 3/2014 | Leguay ................. H04W 28/12 370/236 |
| 2014/0101762 A1 | 4/2014 | Harlacher et al. |
| 2014/0150081 A1 | 5/2014 | Cooley |
| 2014/0157405 A1 | 6/2014 | Joll et al. |
| 2015/0222653 A1* | 8/2015 | Cabrera .............. H04L 63/1416 726/23 |

OTHER PUBLICATIONS

International Searching Authority, "Notification of Transmittal of International Search Report and Written Opinion", PCT/US2014053199, dated May 15, 2015, 13 pages.

Roschke, S. et al., "Intrusion Detection in The Cloud", 2009 IEEE International Conference, Dec. 12-14, 2009, 6 pages.

* cited by examiner

DISTRIBUTED DETECTION OF MALICIOUS CLOUD ACTORS

BACKGROUND

Modern server computing devices are commonly subject to malicious attacks such as denial of service (DOS) attacks, attacks to gain unauthorized access to content, etc. For example, malicious attacks can be performed by worms that are covertly installed on user computing devices. In other cases, proxies or other obfuscation methods can be used to conceal the source of the malicious attacks. Malicious attacks are typically detected by monitoring the incoming traffic of a server to proactively detect abnormalities and then block the malicious sources.

BRIEF DESCRIPTION OF THE DRAWINGS

The following detailed description references the drawings, wherein.

DETAILED DESCRIPTION

As detailed above, malicious attacks can be detected by analyzing logs of incoming traffic for a server computing device. A malicious attack can be detected when characteristics of the incoming traffic exceed a certain preconfigured threshold such as over fifty requests from a single source in a minute can be detected as a DOS attack. Detection of malicious attacks is typically performed by border devices, which exist on the edge of networks, such as a border firewall. In some cases, cloud services provide software defined networking (SDN) features that use IP masquerading, which hides the true IP of customer traffic from border devices thereby making it difficult to identify a source of the traffic.

However, when providing cloud services, analyzing logs of a single cloud server may not provide a complete view of the state of a customer's services, which can be provided by multiple cloud servers on different networks. Further, outgoing traffic should also be analyzed to ensure customers are not purchasing shares of cloud servers to perform outgoing malicious activity. For example, a customer may purchase shares of twenty cloud servers and configure each cloud server to perform actions that fall just below a preconfigured threshold that is configured malicious activity. In this example, the combined activity of the cloud servers achieves the malicious actions of the customer while avoiding detection by typical intrusion detection systems (IDS). Another concern of cloud customers is data privacy, which should be maintained when performing intrusion detection.

Examples disclosed herein address these concerns by not only detecting malicious actions from a particular source but to correlate traffic with particular customers, which allows for profiles to be maintained for customer usage over time that can be used to detect anomalous behavior. Further, in order to protect the privacy of the customers, the analysis is performed using non-sensitive data such as internet protocol (IP) and transmission control protocol (TCP)/user datagram protocol (UDP) port information. In other words, deep packet inspection is not performed so that customer privacy can be maintained.

Figure 1:
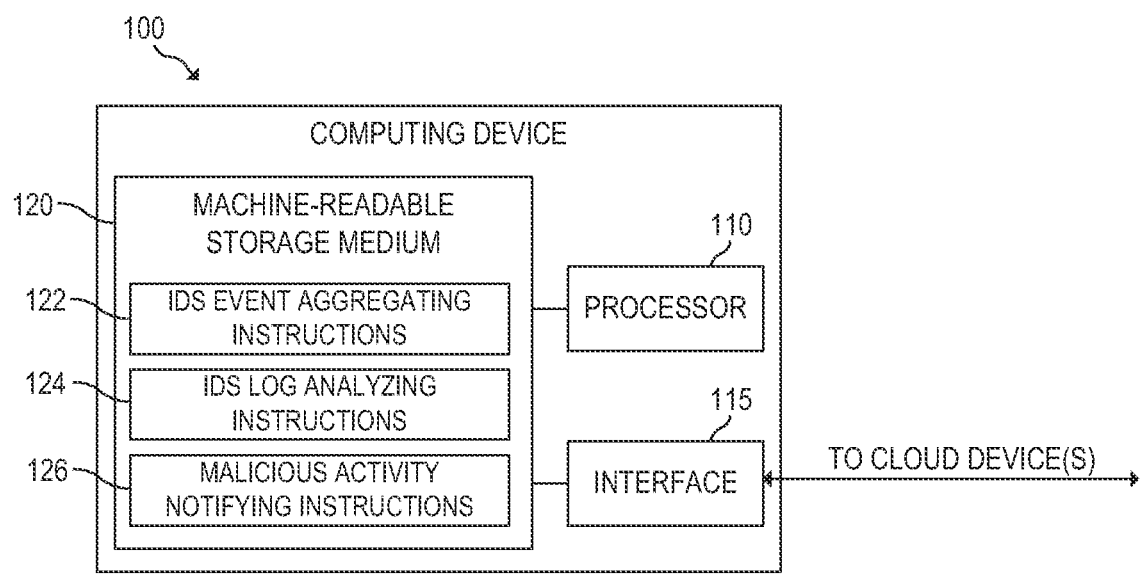
FIG. 1 is a block diagram of an example computing device for distributed detection of malicious cloud actors.

Referring now to the drawings, FIG. 1 is a block diagram of an example computing device 100 for distributed detection of malicious cloud actors. Computing device 100 may be any computing device (e.g., server, desktop computer, etc.) with access to cloud computing devices that are configured to provide cloud services, such as cloud servers 280A, 280N of FIG. 2. In the embodiment of FIG. 1, server computing device 100 includes a processor 110, an interface 115, and a machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126 to enable distributed detection of malicious cloud actors, as described below. As an alternative or in addition to retrieving and executing instructions, processor 110 may include one or more electronic circuits comprising a number of electronic components for performing the functionality of one or more of instructions 122, 124, 126.

Interface 115 may include a number of electronic components for communicating with cloud devices. For example, interface 115 may be an Ethernet interface, a Universal Serial Bus (USB) interface, an IEEE 1394 (Firewire) interface, an external Serial Advanced Technology Attachment (eSATA) interface, or any other physical connection interface suitable for communication with the user computing device. Alternatively, interface 115 may be a wireless interface, such as a wireless local area network (WLAN) interface or a near-field communication (NFC) interface. In operation, as detailed below, interface 115 may be used to send and receive data to and from a corresponding interface of a cloud device.

Machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for distributed detection of malicious cloud actors.

IDS event aggregating instructions 122 may aggregate potential intrusion events from IDS modules. The IDS modules may intercept data packets (i.e., cloud packets) of cloud computing devices. Specifically, outgoing and incoming cloud packets of cloud computing devices can be intercepted and added to a server queue for processing. The cloud packets are typically intercepted at the border of a network by a border device such as a networking device that manages a firewall. The border device typically exists in the same network as the cloud computing devices. The cloud packets are intercepted for processing and can be used to generate the potential intrusion events if a preliminary threshold is exceeded. The potential intrusion events are then provided to computing device 100, where IDS aggregating instructions 122 may update an aggregate log associated with the customer based on the potential intrusion events. Initially, characteristics of each cloud packet such as a source and/or a destination of the packet are considered when generating the potential intrusion events. In this manner, the aggregate log indirectly tracks networking activity for multiple cloud computing devices associated with the customer, where the cloud computing devices may be located in different networks. For example, the outgoing packets from the cloud computing devices to a particular location can be logged such that all potential intrusion events associated with the customer (i.e., from cloud computing devices in different networks) to the location can be determined.

IDS log analyzing instructions 124 may determine if an intrusion threshold is exceeded. In this example, the intrusion threshold is satisfied at a higher activity threshold than the preliminary threshold of the IDS modules. In other words, the preliminary thresholds are triggered at lower activity levels than typically required for intrusion detection (e.g., fifty requests per minute instead of two-hundred requests per minute). In this case, the aggregate log allows for potential intrusion events associated with multiple cloud computing devices to be considered when determining if the intrusion threshold is exceeded.

Malicious activity notifying instructions 126 may send a notification that the customer is potentially performing a malicious activity to an administrator in response to determining that outgoing traffic for a customer to a particular location exceeds the intrusion threshold. In another example, in response to determining that incoming traffic to cloud computing devices associated with a customer exceeds the intrusion threshold, a notification that the customer's cloud computing devices are under attack can be sent to the customer and/or an administrator.

Because cloud services provided for the customer can be located in different networks, the instructions 122, 124, 126 as described above may be executed on data aggregated from multiple networks to monitor network activity of multiple cloud computing devices of the customer. The resulting aggregate log tracks statistics for the cloud computing devices associated with the customer.

Figure 2:
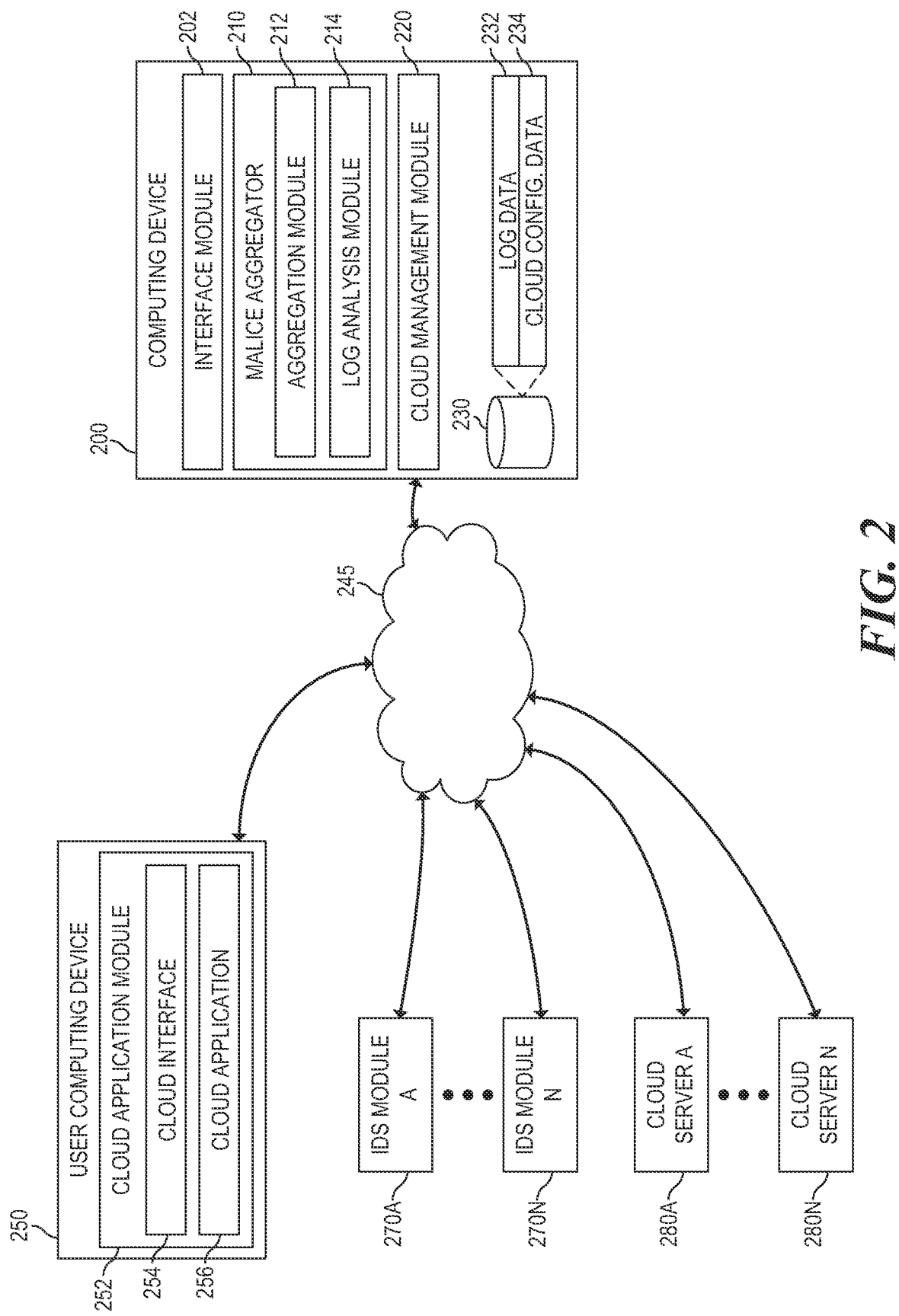
FIG. 2 is a block diagram of an example computing device in communication with a user computing device and cloud servers for distributed detection of malicious cloud actors.

FIG. 2 is a block diagram of an example computing device 200 in communication via a network 245 with a user computing device 250 and cloud servers 280A, 280N. As illustrated in FIG. 2 and described below, computing device 200 may communicate with user computing device 250 to manage access to cloud servers 280A, 280N.

As illustrated, computing device 200 may include a number of modules 202, 210, 212, 214, and 220, while user computing device 250 may include a number of modules 252-256. Each of the modules may include a series of instructions encoded on a machine-readable storage medium and executable by a processor of the respective device 200, 250. In addition or as an alternative, each module may include one or more hardware devices including electronic circuitry for imple-menting the functionality described below.

As with computing device 100 of FIG. 1, computing device 200 may be any computing device with access to cloud servers 280A, 280N over a network 245 that is suitable for executing the functionality described below. As detailed below, computing device 200 may include a series of modules 202-224 for distributed detection of malicious cloud actors.

Interface module 202 may initiate connections with IDS modules (e.g., IDS module A 270A, IDS module N 270N) and receive communications from the IDS modules, Specifically, the interface module 202 may receive potential intrusion events from the IDS modules for processing as described below.

Malice aggregator 210 may manage an aggregation log for detecting malicious activity. Although the components of malice aggregator 210 are described in detail below, additional details regarding an example implementation of malice aggregator 210 are provided above in connection with instructions 122, 124, and 126 of FIG. 1.

Server queue module 212 may update an aggregate log based on potential intrusion events received from. The aggregate log may reflect information related to multiple cloud servers (e.g., cloud server A 280A, cloud server N 280N) on different networks that provide cloud services for the customer. Each of the potential intrusion events may identify a customer and a destination and/or source of the network activity that triggered the potential intrusion event.

Log analysis module 214 may analyze the aggregate log to detect malicious activity. As noted above, the aggregate log includes information about multiple cloud servers (e.g., cloud server A 280A, cloud server N 280N) on different networks that are associated with a particular customer, which allows the analysis to be performed based on a particular customer rather than a particular server. Log analysis module 214 analyzes the potential intrusion events associated with the customer to detect malicious activity by or against the customer. For example, log analysis module 214 may analyze the source of potential intrusion events directed at the cloud servers (e.g., cloud server A 280A, cloud server N 280N) to determine if a DOS attack is being performed against the customer. In another examples, log analysis module 214 may analyze the destination of potential intrusion events from the cloud servers (e.g., cloud server A 280A, cloud server N 280N) to determine if a DOS attack is being performed by the customer.

Cloud management module 220 may provide computing device 200 with access to the configuration of the cloud servers (e.g., cloud server A 280A, cloud server N 280N). Specifically, cloud management module 220 can determine the cloud servers (e.g., cloud server A 280A, cloud server N 280N) are associated with each customer, which malice aggregator 210 can use when updating an aggregate log for each customer.

Computing device 200 includes storage device 230, which may be any hardware storage device for maintaining data accessible to computing device 200. For example, storage device 230 may include one or more hard disk drives, solid state drives, tape drives, and/or any other storage devices. The storage devices may be located in computing device 200 and/or in another device in communication with computing device 200. As detailed above, storage device 230 may maintain log data 232 and cloud configuration data 234. In some cases, storage device 230 is cloud accessible so that it can be accessed from other similarly configured computing devices on different networks.

User computing device 250 may be a notebook, desktop, tablet, workstation, mobile device, or any other device suitable for executing the functionality described below. As detailed below, user computing device 250 may include a series of modules 252-256 for enabling a user to access cloud services provided by computing device 200.

Cloud application module 252 may provide a user with access to cloud services provided by the computing device 200. Cloud interface 254 manages communication with cloud servers (e.g., cloud server A 280A, cloud server N 280N), which are intercepted by interface module 202 of computing device 200 as described above. Cloud interface 254 sends cloud packets requesting cloud services from the cloud servers (e.g., cloud server A 280A, cloud server N 280N).

Cloud application 256 is a user application that directs the consumption of cloud services on behalf of a user of user computing device 250. For example, cloud application 256 may be a web browser that accesses cloud services of the cloud servers (e.g., cloud server A 280A, cloud server N 280N) via the Internet. In another example, cloud application 256 may manage automated jobs of the user that access cloud services periodically.

Each IDS module (e.g., IDS module A 270A, IDS module N 270N) may intercept communications between the user computing device 250 and cloud servers 280A, 280N. Specifically, the interface module 202 may intercept and process cloud packets in a server queue. Characteristics of the cloud packets may be determined and then used to generate potential intrusion events. For example, if network activity to a particular cloud server (e.g., cloud server A 280A, cloud server N 280N) exceeds a preliminary threshold, a potential intrusion event may be generated. Devices similar IDS modules (e.g., IDS module A 270A, IDS module N 270N) may exist in each network to monitor cloud packets and detect malicious activity as described below. For example, IDS modules (e.g., IDS module A 270A, IDS module N 270N) may be incorporated into networking devices of each of the networks.

Each IDS module (e.g., IDS module A 270A, IDS module N 270N) manages the creation and/or destruction of additional IDS modules based on the size of the server queue. For example, if the server queue reaches a preconfigured upper threshold, the IDS module (e.g., IDS module A 270A, IDS module N 270N) may initiate the creation of additional IDS modules. In this example, if the server queue reaches a preconfigured lower threshold, some of the IDS modules (e.g., IDS module A 270A, IDS module N 270N) may initiate self-destruct procedures. In this manner, the number of IDS modules (e.g., IDS module A 270A, IDS module N 270N) can be modified to be proportional to the quantity of cloud packets for processing in the server queue. In these cases, a subset of IDS modules (e.g., IDS module A 270A, IDS module N 270N) may be designated as permanent (i.e., engines that do not self-destruct), where the permanent engines are responsible for generating potential intrusion events as described above.

In some cases, each IDS module (e.g., IDS module A 270A, IDS module N 270N) initially adds the cloud packets to the server queue and then, as the cloud packets are processed in the server queue, the IDS module forwards the cloud packets to their intended destinations. In some cases, the IDS module (e.g., IDS module A 270A, IDS module N 270N) may be configured to sample cloud packets rather than add all cloud packets to the server queue to optimize performance.

Cloud servers (e.g., cloud server A 280A, cloud server N 280N) may be any computing device suitable for providing a cloud services to computing device 200. For example, cloud servers (e.g., cloud server A 280A, cloud server N 280N) may provide email to a business (i.e., the customer) that is accessible through a web browser, where the cloud servers are configured in a distributed system across multiple networks. In another example, cloud servers (e.g., cloud server A 280A, cloud server N 280N) may provide an e-commerce web site for selling products that is accessible through a web browser.

Figure 3:
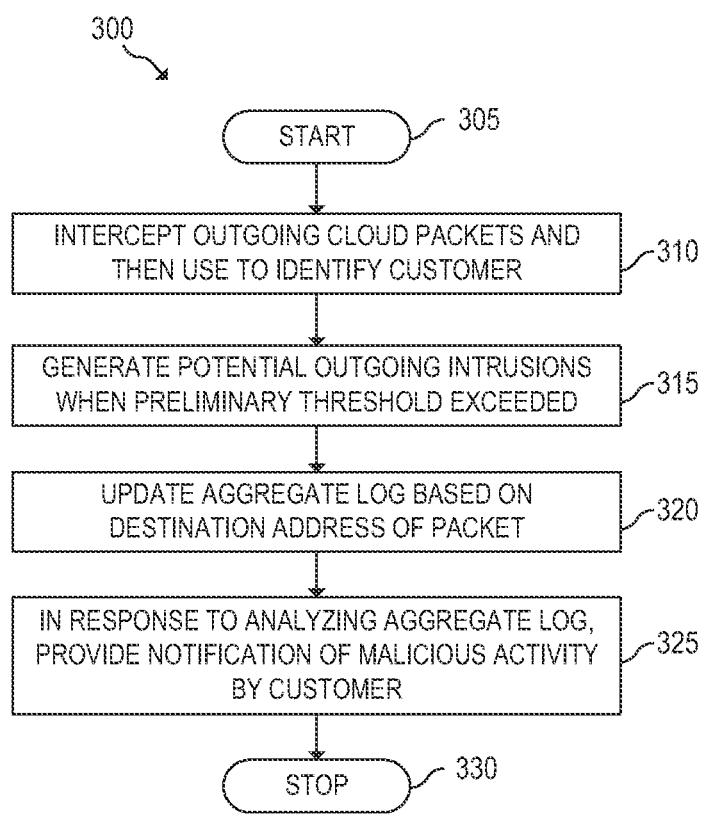
FIG. 3 is a flowchart of an example method for execution by a computing device for distributed detection of malicious cloud actors.

FIG. 3 is a flowchart of an example method 300 for execution by a computing device 100 for distributed detection of malicious cloud actors. Although execution of method 300 is described below with reference to computing device 100 of FIG. 1, other suitable devices for execution of method 300 may be used, such as computing device 200 of FIG. 2. Method 300 may be implemented in the form of executable instructions stored on a machine-readable storage medium, such as storage medium 120, and/or in the form of electronic circuitry.

Method 300 may start in block 305 and continue to block 310, where IDS modules may intercept cloud packets of cloud computing devices. Specifically, outgoing and incoming cloud packets of cloud computing devices can be intercepted and then processed to update local logs. In block 315, the IDS modules may use the local logs to generate potential intrusion events associated with a customer that are sent to computing device 100.

In block 320, computing device 100 may update an aggregate log associated with the customer based on the potential intrusion events from the IDS modules. In response to analyzing the aggregate log to determine if an intrusion threshold is exceeded, computing device 100 may send a notification that the customer is potentially performing a malicious activity to an administrator in block 325. Method 300 may then proceed to block 330, where method 300 may stop.

Figure 4A:
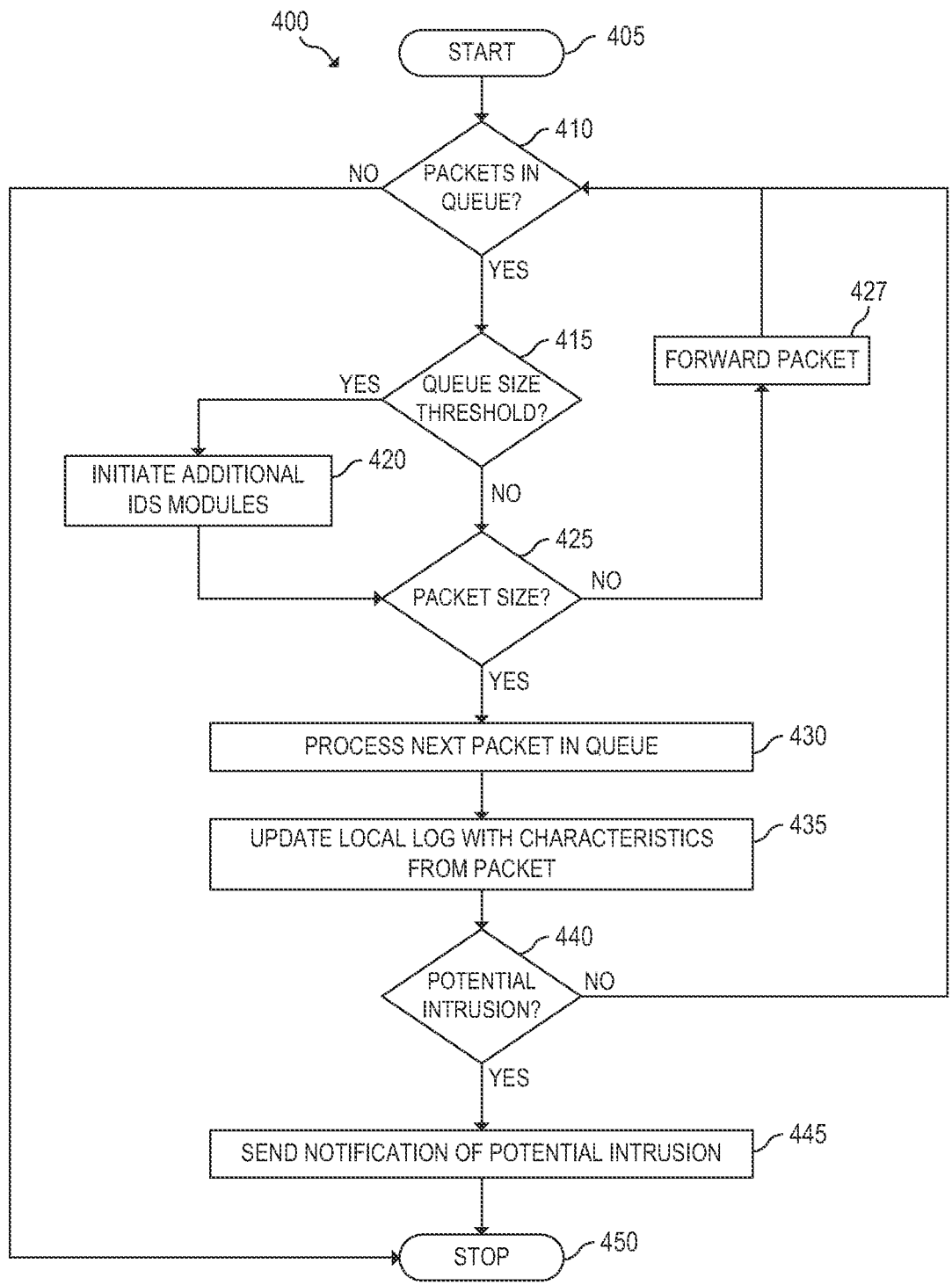
FIGS. 4A and 4B are flowcharts of example methods for execution by a computing device for processing a server queue to perform distributed detection of malicious cloud actors.

FIG. 4A is a flowchart of an example method 400 for execution by a IDS modules (e.g., IDS module A 270A of FIG. 2, IDS module N 270N of FIG. 2) for processing a server queue to generate potential intrusion events. Although execution of method 400 is described below with reference to IDS modules (e.g., IDS module A 270A of FIG. 2, IDS module N 270N of FIG. 2) of FIG. 2, other suitable devices for execution of method 400 may be used, Method 400 may be implemented in the form of executable instructions stored on a machine-readable storage medium and/or in the form of electronic circuitry.

Method 400 may start in block 405 and continue to block 410, where the IDS module determines if there are any cloud packets to process in a server queue. The cloud packets are intercepted packets between a user computing device and a cloud server. If there are no cloud packets to process, method 400 may continue to block 450, where method 400 may stop. If there are cloud packets to process, method 400 continues to block 415, where the IDS module determines if the size of the server queue exceeds a threshold queue size. If the size exceeds the threshold queue size, the IDS module may initiate the creation of additional malice aggregator(s) for processing the server queue in block 420.

If the size does not exceed the threshold queue size, the IDS module determines if the next packet exceeds a threshold packet size for processing in block 425. In block 427 if the next packet does not exceed the threshold packet size, the next packet is forwarded to its intended destination (e.g., user computing device, cloud server, etc.) and then method 400 returns to block 410 to process the next cloud packet. The threshold packet size is used to filter packets that are too small to be considered for further analysis. If the next packet does exceed the threshold packet size, the IDS module processes the next packet in the server queue in block 430. For example, the IDS module may extract characteristics such as the source or destination from the next packet.

In block 435, a local log is updated with the characteristics that were extracted from the next packet. The local log may be associated with a customer that is associated with multiple cloud servers distributed across different networks.

Thus, the local log is able to reflect incoming traffic from various sources and targeted at different servers on the network that are associated with the customer or outgoing traffic from the different servers to a particular source. In block 440, the IDS module determines if a potential intrusion has occurred based on the local log. For example, the IDS module may determine a quantity of cloud packets from the different servers to a particular source exceeds a preconfigured threshold. If no potential intrusion is detected, method 400 returns to block 410 to process the next packet.

Figure 4B:
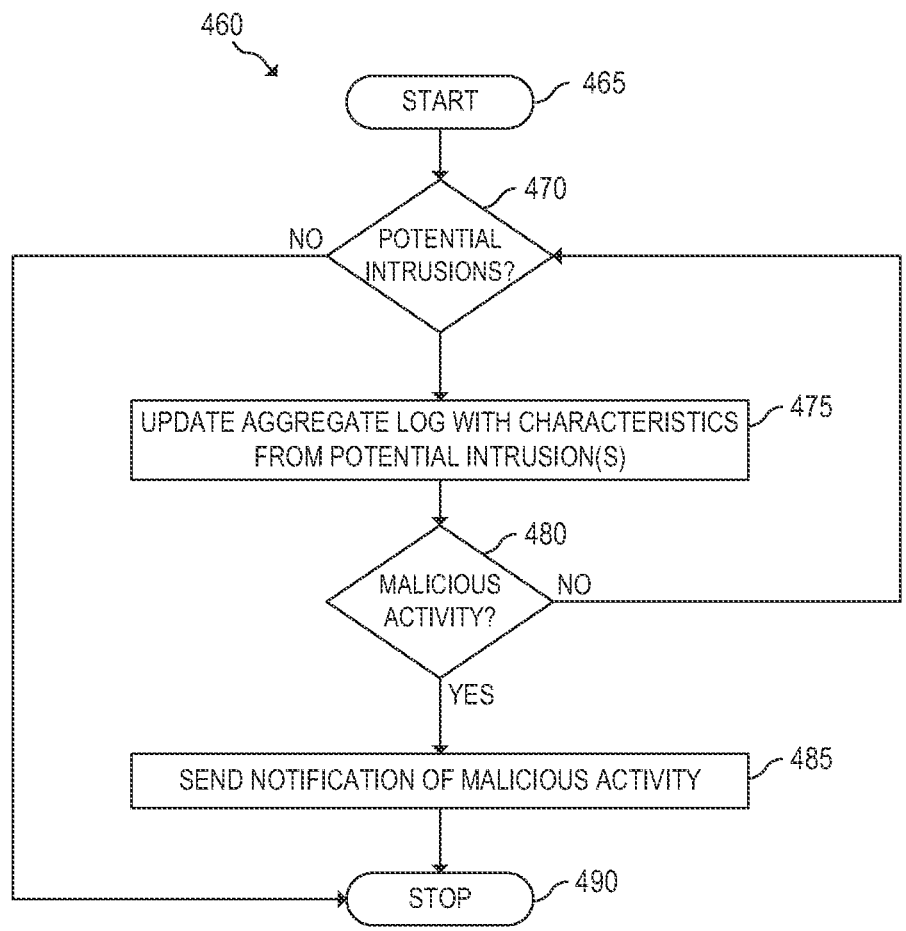

If a potential intrusion is detected, the IDS module sends a notification of the potential intrusion in block 445. For example, a notification of potential intrusion by the customer can be sent to a computing device that is managing an aggregate log for analysis as described below with respect to FIG. 4B. Method 400 may then continue to block 450, where method 400 may stop.

FIG. 4A is a flowchart of an example method 460 for execution by computing device 100 for processing potential intrusion events to perform distributed detection of malicious activity. Although execution of method 460 is described below with reference to IDS modules computing device 100 of FIG. a, other suitable devices for execution of method 460 may be used. Method 460 may be implemented in the form of executable instructions stored on a machine-readable storage medium and/or in the form of electronic circuitry.

Method 460 may start in block 465 and continue to block 470, where computing device 100 determines if any potential intrusion events have been received. If no potential intrusion events have been received, method 460 may proceed to block 490 and stop. If potential intrusion events have been received, computing device 100 may use the potential intrusion events to update an aggregate log in block 475. Specifically, characteristics such as an associated customer, a source, and/or a destination of the potential intrusion events may be used to update the aggregate log.

In block 480, computing device 100 determines if malicious activity has occurred based on the aggregate log. For example, computing device 100 may determine if potential intrusion events associated with a particular source exceed an intrusion threshold. If no potential intrusion is detected, method 460 returns to block 470 to process the next potential intrusions.

If a potential intrusion is detected, computing device 100 sends a notification of the malicious activity in block 485. For example, a notification of malicious activity by the customer can be sent to an administrator. Method 460 may then continue to block 490, where method 460 may stop.

The foregoing disclosure describes a number of example embodiments for distributed detection of malicious cloud actors. In this manner, the embodiments disclosed herein improve detection of malicious activity in a cloud environment by logging network traffic according to customers rather than particular servers.

I claim:

1. A system for distributed detection of malicious cloud actors, the system comprising:
   an interface module to initiate connections with a plurality of intrusion detection modules associated with a plurality of cloud servers;
   the plurality of intrusion detection modules that are each connected to a cloud server of the plurality of cloud servers, wherein each of the plurality of cloud servers is configured to provide a cloud service that is associated with a customer of a plurality of customers, each of the plurality of intrusion detection modules to:
   intercept a plurality of outgoing cloud packets from the cloud server that are processed to determine if a preliminary threshold is exceeded, wherein a potential outgoing intrusion event of a plurality of potential outgoing intrusion events is generated when the preliminary threshold is exceeded; and
   provide each potential outgoing intrusion event to the interface module; and
   a malice aggregator for execution by a processor to:
   receive the plurality of outgoing intrusion events from the interface module;
   update an aggregate log based on the plurality of potential outgoing intrusion events, wherein the aggregate log tracks a customer subset of the plurality of cloud servers that is associated with the customer;
   in response to analyzing the aggregate log to determine that cloud traffic by the customer to a destination address exceeds an intrusion threshold, provide a notification of malicious activity by the customer, wherein the intrusion threshold is satisfied at a higher cloud activity level than the preliminary threshold;
   track statistics for the plurality of cloud servers as associated with each customer from the aggregate log;
   identify multiple cloud devices being utilized by each customer across multiple ore s of the plurality of cloud servers within the aggregate log;
   maintain a profile for each customer over time based on the corresponding statistics to detect anomalous behavior of each customer while maintaining a privacy for each customer through utilization of non-sensitive data included with network protocols without deep packet inspection;
   maintain a current total number of intrusion detection modules that are processing to be proportional to a quantity of the outgoing cloud packets residing in a server queue with a subset of the intrusion detection modules designated as permanent.

2. The system of claim 1, wherein each of the plurality of intrusion detection modules uses identified packets of the plurality of outgoing cloud packets that exceed a threshold packet size to determine if the preliminary threshold is exceed.

3. The system of claim 1, wherein the plurality of outgoing cloud packets are iteratively processed in the server queue, wherein each of the plurality of intrusion detection modules is further configured to:
   in response to determining that the server queue exceeds a threshold queue size, request that an additional intrusion detection module be instantiated to process the plurality of outgoing cloud packets in the server queue.

4. The system of claim 3, wherein the additional intrusion detection module is configured to:
   in response to determining that the server queue no longer exceeds the threshold queue size, initiate a self-destruct procedure.

5. The system of claim 4, wherein the subset of the intrusion detection modules comprises at least one intrusion detection module.

6. The system of claim 1, wherein each of the plurality of intrusion detection modules is further configured to:
   intercept a plurality of incoming cloud packets directed at the cloud server to determine if the preliminary threshold is exceeded, wherein a potential incoming intrusion event of a plurality of potential incoming intrusion events is generated when the preliminary threshold is exceeded; and wherein the malice aggregator is further to:
update an incoming aggregate log that is associated with the customer subset of the plurality, of cloud servers based on the plurality of potential incoming intrusion events; and
in response to analysing the incoming aggregate log to determine that cloud traffic directed at the customer subset exceeds the intrusion threshold, provide a customer notification of malicious activity that is targeted at the customer subset.

7. A method for distributed detection of malicious cloud actors, the method comprising:
intercepting a plurality of outgoing cloud packets from a plurality of cloud servers that are processed by a plurality of intrusion detection modules to determine if a preliminary threshold is exceeded, wherein the plurality of outgoing cloud packets is used to identify a customer of a plurality of customers, and wherein each cloud server includes at least one of the plurality of intrusion detection modules;
generating, by the intrusion detection modules, a potential outgoing intrusion event of a plurality of potential outgoing intrusion events when the preliminary threshold is exceeded;
providing, by the intrusion detection modules, each of the potential outgoing intrusion events to a malice aggregator associated with a device other than the plurality of cloud servers; and
updating, by the malice aggregator, an aggregate log based on the plurality of potential outgoing intrusion events, wherein the aggregate log tracks a customer subset of the plurality of cloud servers that is associated with the customer;
in response to analyzing the aggregate log to determine that cloud traffic by the customer to a destination address exceeds an intrusion threshold, providing, by the malice aggregator, a notification of malicious activity by the customer, wherein the intrusion threshold is satisfied at a higher cloud activity level than the preliminary threshold;
tracking, by the malice aggregator, statistics for the plurality of cloud servers as associated with each customer from the aggregate log;
identifying multiple cloud devices being utilized by each customer across multiple ones of the plurality of cloud servers within the aggregate log;
maintaining, by the malice aggregator, a profile for each customer over time based on the corresponding statistics to detect anomalous behavior of each customer while maintaining a privacy for each customer through utilization of non-sensitive data included with network protocols without deep packet inspection; and
maintaining, by the intrusion detection modules, a current total number of intrusion detection modules that are processing to be proportional to a quantity of the outgoing cloud packets residing in a server queue with a subset of the intrusion detection modules designated as permanent.

8. The method of claim 7, wherein each of the plurality of intrusion detection modules uses identified packets of the plurality of outgoing cloud packets that exceed a threshold packet size to determine if the preliminary threshold is exceed.

9. The method of claim 7, wherein the plurality of outgoing cloud packets are iteratively processed in the server queue, wherein the method further comprises:
in response to determining that the server queue exceeds a threshold queue size, requesting that an additional intrusion detection module be instantiated to process the plurality of outgoing cloud packets in the server queue.

10. The method of claim 9, wherein the subset of the intrusion detection modules comprises at least one intrusion detection module.

11. The method of claim 7, further comprising:
intercepting a plurality of incoming cloud packets directed at each of the cloud servers to determine if the preliminary threshold is exceeded, wherein a potential incoming intrusion event of a plurality of potential incoming intrusion events is generated when the preliminary threshold is exceeded;
updating an incoming aggregate log that is associated with the customer subset of the plurality of cloud servers based on the plurality of potential incoming intrusion events; and
in response to analyzing the incoming aggregate log to determine that cloud traffic directed at the customer subset exceeds the intrusion threshold, providing a customer notification of malicious activity that is targeted at the customer subset.

12. A non-transitory machine-readable storage medium encoded with instructions executable by a processor for distributed detection of malicious cloud actors, the machine-readable storage medium comprising instructions to:
intercept a plurality of outgoing cloud packets from each cloud server of a plurality of cloud servers, each cloud packet is processed in each server queue of a plurality of server quests by one of a plurality of intrusion detection modules to determine if a preliminary threshold is exceeded, wherein the plurality of outgoing cloud packets is used to identify a customer of a plurality of customers;
in response to determining that any of the server queues exceed a threshold queue size, request that an additional intrusion detection module be instantiated to process the plurality of outgoing cloud packets from a corresponding server queue;
generate, by each intrusion detection module, a potential outgoing intrusion event of a plurality of potential outgoing intrusion events when the preliminary threshold is exceeded;
provide, by each of the intrusion detection modules, the potential outgoing intrusion event to a malice aggregator associated with a device other than the plurality of cloud servers; and
update, by the malice aggregator, an aggregate long based on the plurality of potential outgoing intrusion events, wherein the aggregate log tracks a customer subset of the plurality of cloud servers that is associated with the customer;
in response to analyzing the aggregate log to determine that cloud traffic by the customer to a destination address exceeds an intrusion threshold, provide, by the malice aggregator, a notification of malicious activity by the customer, wherein the intrusion threshold is satisfied at a higher cloud activity level than the preliminary threshold;
track statistics for the plurality of cloud servers as associated with each customer from the aggregate log;
identify multiple cloud devices being utilized by each customer across multiple ones of the plurality of cloud servers within the aggregate log;

maintain a profile for each customer over time based on the corresponding statistics to detect anomalous behavior of each customer while maintaining a privacy for each customer through utilization of non-sensitive data included with network protocols without deep packet inspection and maintain a current total number of intrusion detection modules that are processing to be proportional to a quantity of the outgoing cloud packets residing in the corresponding server queue with a subset of the intrusion detection modules designated as permanent.

13. The non-transitory machine-readable storage medium of claim 12, wherein the plurality of outgoing cloud packets are iteratively processed in each server queue by one of the intrusion detection modules, wherein the instructions are further to:

in response to determining that a given server queue exceeds a threshold queue size, request that an additional intrusion detection module be instantiated to process the plurality of outgoing cloud packets in the given server queue.

14. The non-transitory machine-readable storage medium of claim 13, wherein the subset of the intrusion detection modules comprise at least one intrusion detection module.

15. The non-transitory machine-readable storage medium of claim 12, wherein the instructions are further to:

intercept a plurality of incoming cloud packets directed at the cloud servers to determine if the preliminary threshold is exceeded, wherein a potential incoming intrusion event of a plurality of potential incoming intrusion events is generated when the preliminary threshold is exceeded;

update, by the malice aggregator, an incoming aggregate log that is associated with the customer subset of the plurality of cloud servers based on the plurality of potential incoming intrusion events; and in response to analyzing the incoming aggregate log to determine that cloud traffic directed at the customer subset exceeds the intrusion threshold, provide, by the malice aggregator, a customer notification of malicious activity that is targeted at the customer subset.

* * * * *